(12) United States Patent
Zhang

(10) Patent No.: US 9,946,648 B1
(45) Date of Patent: Apr. 17, 2018

(54) CACHE COHERENCY PROTOCOL-BASED PREFETCHING METHODS AND SYSTEMS

(71) Applicant: Marvell International Ltd., Hamilton (BM)

(72) Inventor: Wei Zhang, Shanghai (CN)

(73) Assignee: Marvell International Ltd., Hamilton (BM)

( * ) Notice: Subject to any disclaimer, the term of this patent is extended or adjusted under 35 U.S.C. 154(b) by 71 days.

(21) Appl. No.: 15/073,538

(22) Filed: Mar. 17, 2016

Related U.S. Application Data

(60) Provisional application No. 62/196,427, filed on Jul. 24, 2015.

(51) Int. Cl.
*G06F 12/08* (2016.01)
*G06F 12/0815* (2016.01)
*G06F 12/0862* (2016.01)

(52) U.S. Cl.
CPC ...... *G06F 12/0815* (2013.01); *G06F 12/0862* (2013.01); *G06F 2212/45* (2013.01); *G06F 2212/6022* (2013.01); *G06F 2212/621* (2013.01)

(58) Field of Classification Search
None
See application file for complete search history.

(56) References Cited

U.S. PATENT DOCUMENTS

| | | | | |
|---|---|---|---|---|
| 2002/0078061 A1* | 6/2002 | Wong | ............... | G06F 12/0862 |
| 2005/0172082 A1* | 8/2005 | Liu | ............... | G06F 12/0862 711/144 |
| 2005/0251629 A1* | 11/2005 | Fahs | ............... | G06F 12/0862 711/137 |
| 2010/0077154 A1* | 3/2010 | Chou | ............... | G06F 12/0862 711/137 |
| 2010/0281221 A1* | 11/2010 | Cantin | ............... | G06F 12/0813 711/132 |
| 2013/0346703 A1* | 12/2013 | McCauley | ............... | G06F 12/0862 711/137 |
| 2015/0378919 A1* | 12/2015 | Anantaraman | ............... | G06F 12/0862 711/122 |

* cited by examiner

*Primary Examiner* — Kaushikkumar Patel

(57) ABSTRACT

A method includes linking together a set of cache lines, tracking historical changes to the cache coherency protocol states of the set of cache lines, and prefetching to a cache the set of cache lines based at least on the historical changes to the set of cache lines. A cache circuit includes one or more random access memories (RAMs) to store cache lines and cache coherency protocol states of the cache lines and a prefetch logic unit to link together a set of cache lines, to track historical changes to cache coherency protocol states of the set of cache lines, and to prefetch to the cache circuit the set of cache lines based at least on the historical changes to the set of cache lines.

17 Claims, 10 Drawing Sheets

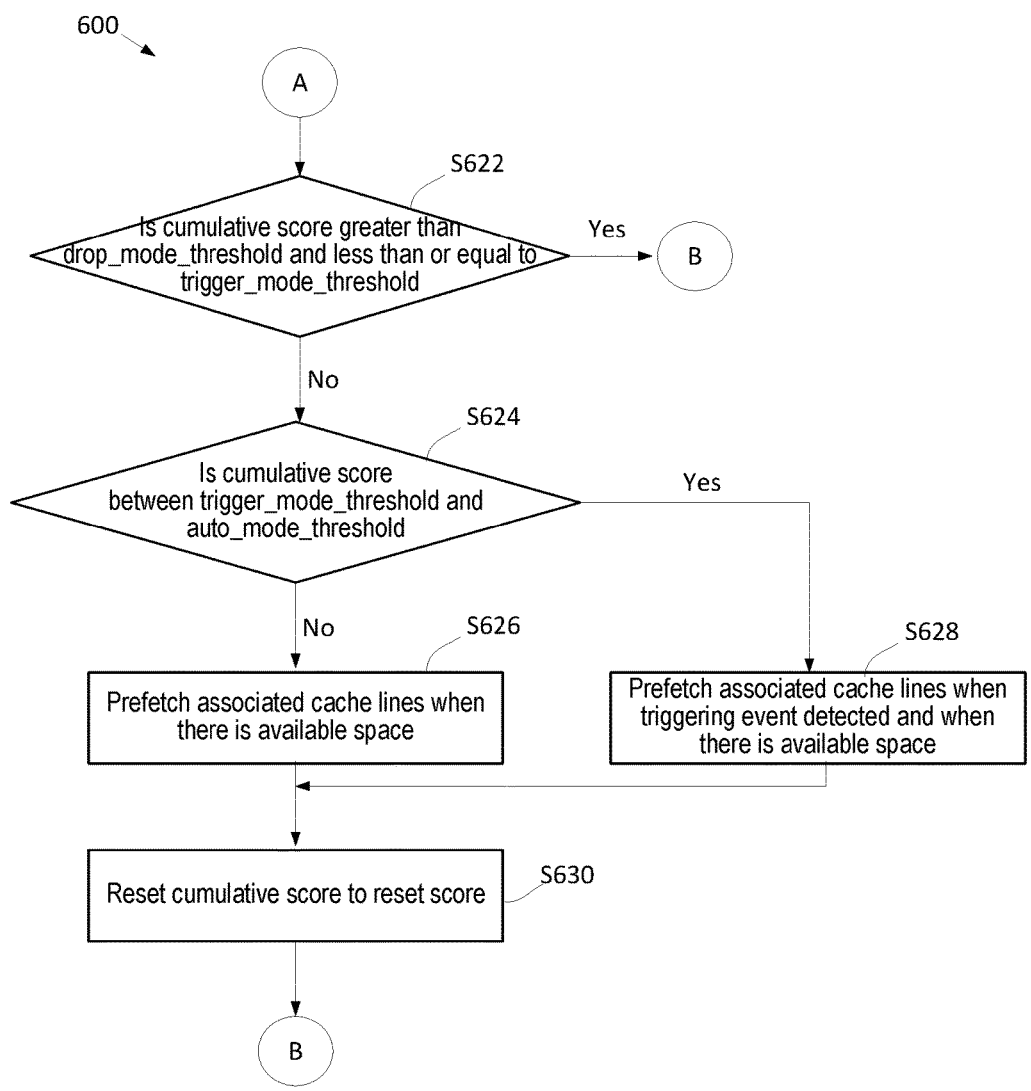

CACHE COHERENCY PROTOCOL-BASED PREFETCHING METHODS AND SYSTEMS

CROSS REFERENCE TO RELATED APPLICATIONS

The present disclosure claims the benefit of U.S. Provisional Application No. 62/196,427, filed on Jul. 24, 2015 which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Multiprocessing computer systems employ multi-core processors that include two or more device cores, each device core associated with a corresponding level-one (L1) cache. A device core may be any one of a central processing unit (CPU), a graphical processing unit (GPU), an accelerated processing unit (APU), a video processing unit (VPU), and the like.

A cache is memory that can provide data to a device core with a latency that is lower than a latency associated with obtaining the data from a main memory. An L1 cache is a first level local memory that holds cached data for a corresponding device core.

The L1 caches of these devices may share data. When a device core needs data that is missing in the local L1 cache, such data may be obtained from a remote L1 cache if the remote L1 cache stores such data. In some cases, these multiprocessing computer systems may further include other types of caches such as level-two (L2) caches, level-three (L3) caches, and so forth that may have higher latencies than the L1 caches.

The data that are moved between an L1 cache and the main memory are typically moved in blocks of data referred to as cache lines. Each cache line will typically be associated with an address, which may be the main memory address where the cache line is stored. When a device core loads a cache line to the L1 cache, a load request indicating the address of the cache line may be sent to the main memory.

Copies of data from the same main memory addresses may be stored in different caches. In multicore systems, each device core may be paired with a respective L1 cache, and a plurality of the L1 caches may have respective copies of the data from the same main memory address.

When one of the copies is modified without the other copies being similarly modified, the data stored in the different L1 caches becomes incoherent. In order to ensure coherency of data stored in different caches, many systems employ cache coherency protocols whereby cache lines stored in cache memory, and more particularly, the addresses of these cache lines, are tagged with one of several different states.

An example of a coherency protocol is the Modified-Owned-Shared-Invalid (MOSI) protocol where a cache line, and more specifically, the cache line address, can be tagged with one of four states, Modified (M), Shared (S), Invalid (I), and Owned (O). These states of a cache line will be specific to a specific device core/cache pair.

In the MOSI protocol when a cache line is tagged Modified in the local cache, the cache line has been modified in the local cache by the local device core. In this situation, if a copy of the same cache line prior to modification was being stored in another cache, the copy (or its associated address) will be tagged as Invalid in the other cache.

When a cache line is tagged Shared in the local cache, the cache line is being shared with one or more other caches and each copy of the data has the same value as the corresponding location in the main memory.

When a cache line is tagged Invalid in the local cache, the cache line that is stored locally in the local cache is invalid (e.g., when a copy of the cache line in another cache has been modified by a remote device core, the local copy will become invalid).

When a cache line is tagged Owned in the local cache, the local device core has the exclusive right to make changes to it and is responsible for responding to any requests from, for example, other caches or from direct memory access (DMA) for the tagged cache line. When a local device core making writes to the Owned-tagged cache line, the local cache may broadcast those changes to the other caches without updating the main memory. The cache with the Owned-tagged cache line writes the cache line back to main memory when the cache line is evicted from the cache.

When a device core needs to load a cache line that is not currently loaded in the corresponding L1 cache, the device core may need to be stalled while it waits for the L1 cache to fetch the cache line.

There are two sources where the cache line may be fetch from when an L1 cache does not currently have a copy of the cache line. The first source is one of the other L1 caches (e.g., remote caches). The second source is the main memory. Obtaining a copy of the cache line from the main memory may be very time consuming and may reduce system performance.

Computer systems may employ software or hardware prefetching mechanisms in order to reduce the effects of cache miss latencies. These prefetching mechanisms may generate load requests for data before the data is requested by the device core in order to load the data into the cache before the device core actually needs the data. Once the requested data has been loaded to the cache, the device core may access the data in the cache by generating a read or write request.

Some systems may employ hardware-based prefetch methods that have fixed sequence to prefetch data in a fixed address pattern. However, such techniques tend to be rigid and not adaptive to changing conditions. As a result, the prefetched data may cause a large amount of data to be prefetched unnecessarily. The unnecessary prefetching requests generated by such mechanisms increase the congestion of system, and may result in unnecessary prefetched data replacing necessary data already in the cache (that is, cache pollution), causing deterioration of the response time of the device core to subsequent instructions that may need to reuse the necessary cache data.

In order to improve performance of currently available prefetching mechanisms, a number of techniques have been proposed in order to improve or supplement currently employed prefetching mechanisms. For example, one approach is to have a separate prefetching data RAM to avoid the cache pollution. However, because of design constraints, the RAM size cannot be very large and as a result, prefetched cache data has to be replaced frequently. Consequently, a device core request will have little chance to hit the data in the prefetching data RAM

SUMMARY

In an embodiment, a method for prefetching cache lines based on historical changes to cache coherency protocol states of the cache lines. The method includes linking together a set of cache lines and tracking historical changes to the cache coherency protocol states of the set of cache lines. The method further includes prefetching to a cache the set of cache lines based at least on the historical changes to the set of cache lines.

In an embodiment, the tracking of the historical changes to the cache coherency protocol states of the set of cache lines includes tracking changes of cache lines of the set of cache lines from a reserve (R) state to one of a modified (M) state, an owned (O) state, a shared (S) state, or an invalid (I) state, where the R state indicates reserved for later use.

In an embodiment, a cache circuit includes one or more random access memories (RAMs) to store cache lines and cache coherency protocol states of the cache lines. The cache circuit further includes a prefetch logic unit to a) link together a set of cache lines, b) track historical changes to cache coherency protocol states of the set of cache lines, and c) prefetch to the cache circuit the set of cache lines based at least on the historical changes to the set of cache lines.

In an embodiment, a multi-core apparatus includes a main memory, a plurality of processor cores, and a plurality of cache circuits. At least one of the cache circuits includes one or more RAMs to store cache lines and cache coherency protocol states of the cache lines, and a prefetch logic unit. The prefetch logic unit to a) link together a set of cache lines, b) track historical changes to cache coherency protocol states of the set of cache lines, and c) prefetch to the cache circuit the set of cache lines based at least on the historical changes to the set of cache lines.

BRIEF DESCRIPTION OF THE DRAWINGS

FIGS. 6A and 6B illustrate a process for developing and maintaining a PAC according to an embodiment.

DETAILED DESCRIPTION

Systems and methods are disclosed herein that provide a prefetching mechanism that takes into account historical changes to cache coherency protocol states of cache lines in order to determine which cache lines are to be prefetched. In particular, the systems and methods may keep track of historical usage of cache lines as prefetched data. Based on the historical usage of cache lines, a determination may be made as to which cache lines should be given priority for prefetching. In order to monitor and track historical usage of prefetched data, the systems and methods may monitor changes to the coherency protocol states of prefetched data under the framework of a Modified-Owned-Shared-Invalid-Reserved (MOSIR) cache coherency protocol, which includes a Reserved (R) state indicating that the tagged data (that is, the cache line) is reserved for later use.

In an embodiment, the systems and methods may link together addresses of multiple cache lines to form an address chain. The systems and methods may then track changes to the coherency protocol states of the cache lines associated with the address chain, and may maintain a cumulative score for the address chain based on the changes to the coherency protocol states of the cache lines. Based, at least in part, on the cumulative score of the address chain, the cache lines associated with the address chain may or may not be prefetched.

Although the following description of the methods and systems will be described with respect to L1 caches, in other implementations, the methods and systems may be implemented with other types of caches such as L2 caches, L3 caches, and so forth.

Figure 1:
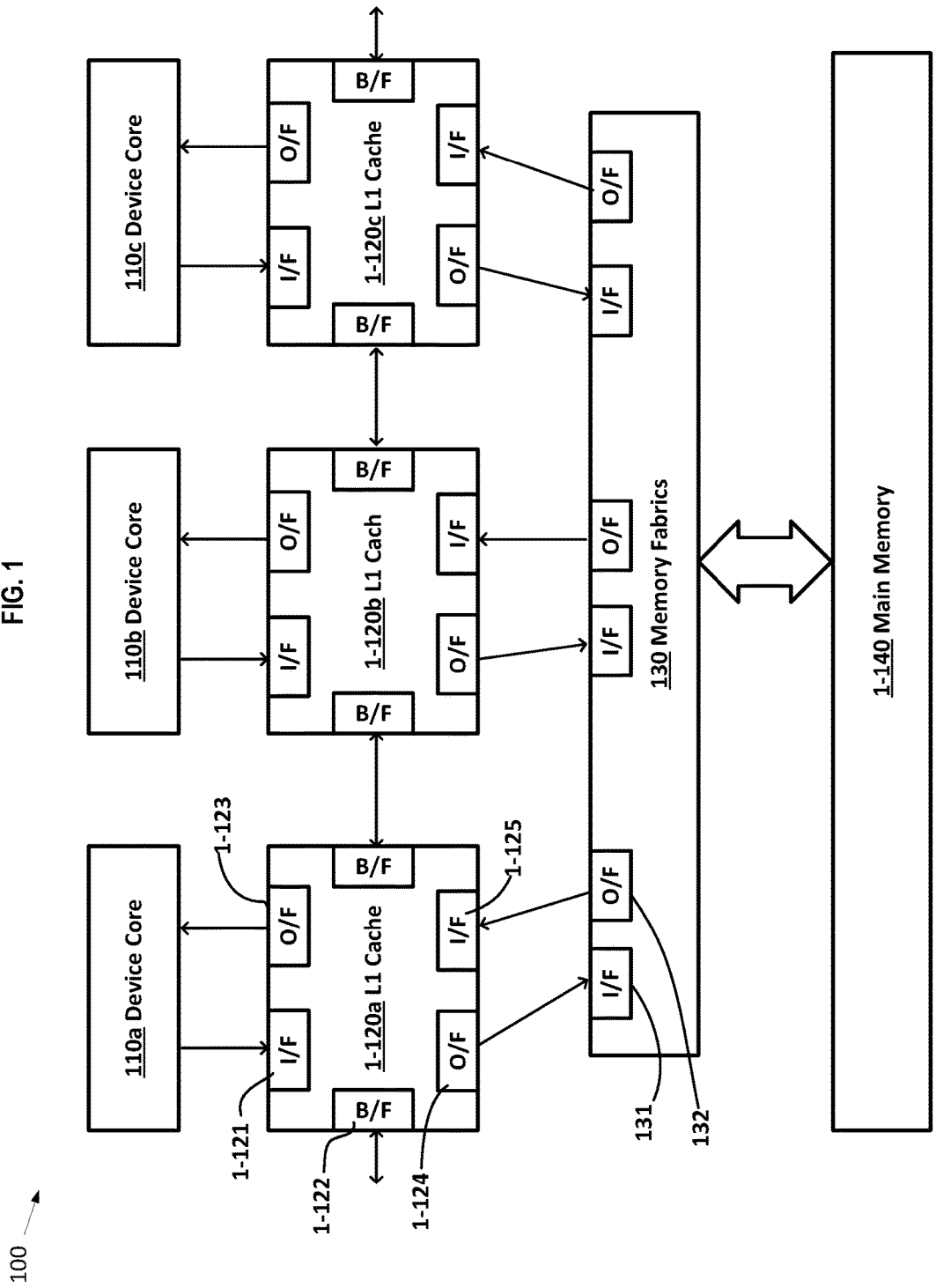
FIG. 1 illustrates a multi-core apparatus with shared L1 caches according to an embodiment.

FIG. 1 illustrates a multi-core apparatus 100 including L1 caches and inter-block connecting interfaces according to an embodiment. The multi-core apparatus 100 includes first, second, and third device cores 110*a*, 110*b*, and 110*c*, respectively, (e.g., processor cores), and first, second, and third L1 caches 1-120*a*, 1-120*b*, and 1-120*c*, respectively. Each of the L1 caches 1-120*a*, 1-120*b*, and 1-120*c* is associated with a respective device core 110*a*, 110*b*, and 110*c*. The multi-core apparatus 100 further including a main memory 140 that is connected to the L1 caches 1-120*a*, 1-120*b*, and 1-120*c* via one or more memory fabrics 130.

In an embodiment, the device cores 110*a*, 110*b*, and 110*c* and the L1 caches 1-120*a*, 1-120*b*, and 1-120*c* may be provided in a single semiconductor chip.

Each of the device cores 110*a*, 110*b*, and 110*c* may download and upload data to and from the main memory 400 through their respective caches 1-120*a*, 1-120*b*, and 1-120*c* and via the memory fabrics 300. In an embodiment, the memory fabrics 300 may be a mesh interconnection.

In some implementations, the L1 caches 1-120*a*, 1-120*b*, and 1-120*c* may comprise high-speed Random Access Memory (RAM) such as Static RAM (SRAM) and Non-Volatile RAM.

In an embodiment, the main memory 140 may include one or more of a double data rate (DDR) SRAM, a Dynamic RAM (DRAM), a Read-Only Memory (ROM), a Flash memory, and the like.

The device cores 110*a*, 110*b*, and 110*c* may each be any one of a GPU, a CPU, an APU or VPU, and the like.

Each of the L1 caches 1-120*a*, 1-120*b*, and 1-120*c* may include: 1) an input interface 1-121 for receiving load requests and store requests from their respective device core 110*a*, 110*b*, and 110*c*; 2) an input interface 1-125 for receiving, through output interface 132 of the memory fabrics 130, fetched or prefetched data from main memory 140; 3) an output interface 1-123 for relaying data to the respective device cores 110*a*, 110*b*, and 110*c*; 4) an output interface 1-124 for relaying data and prefetch requests, through input interface 131 of the memory fabrics 130, to main memory 140; and 5) one or more broadcast interfaces 1-122 for transmitting and receiving cached cache lines between the L1 caches 1-120*a*, 1-120*b*, and 1-120*c*.

For ease of illustration and explanation, the terms "local" and "remote" will be used herein with respect to the device cores 110a, 110b, and 110c and the L1 caches 1-120a, 1-120b, and 1-120c illustrated in FIG. 1. For example, and from the perspective of the first L1 cache 1-120a of FIG. 1, the first device core 110a that is paired with the first L1 cache 1-120a will be referred to herein as the local device core 110a with respect to the first L1 cache 1-120a, while the device cores 110b and 110c, respectively, will be referred to herein as the "remote device cores 110b and 110c with respect to L1 cache 1-120a. Similarly, the first L1 cache 1-120a will be the local L1 cache 1-120a for the first device core 110a.

Each of the L1 caches 1-120a, 1-120b, and 1-120c may share data with the other L1 caches 1-120a, 1-120b, and 1-120c through one of the broadcast interfaces 2-122. For example, when the first device core 110a of FIG. 1 sends a load request to the local L1 cache 1-120a for data (e.g., a cache line) associated with a specific address and a copy of the requested data is not in the local L1 cache 1-120a, then a cache miss has occurred. When the cache miss occurs and before seeking the data from the main memory 140, the local L1 cache 1-120a may broadcast a request for the data to the remote L1 caches 1-120b and 1-120c to determine whether either of the remote L1 caches 1-120b and 1-120b are storing a copy of the requested data associated with the address.

In an embodiment, prefetch requests received by the memory fabrics 130 from L1 caches 1-120a, 1-120b, and 1-120c may be reordered before being issued to main memory 140 to improve system performance and balance system bandwidth.

Although the multi-core apparatus 100 is illustrated as having three device cores 110a, 110b, and 110c and three L1 caches 1-120a, 1-120b, and 1-120c, in other embodiments, the multi-core apparatus 100 may include fewer or more device cores and L1 caches. Further, other types of caches (e.g., L2 caches, L3 caches, and so forth) may also be included in the multi-core apparatus 100.

Figure 2:
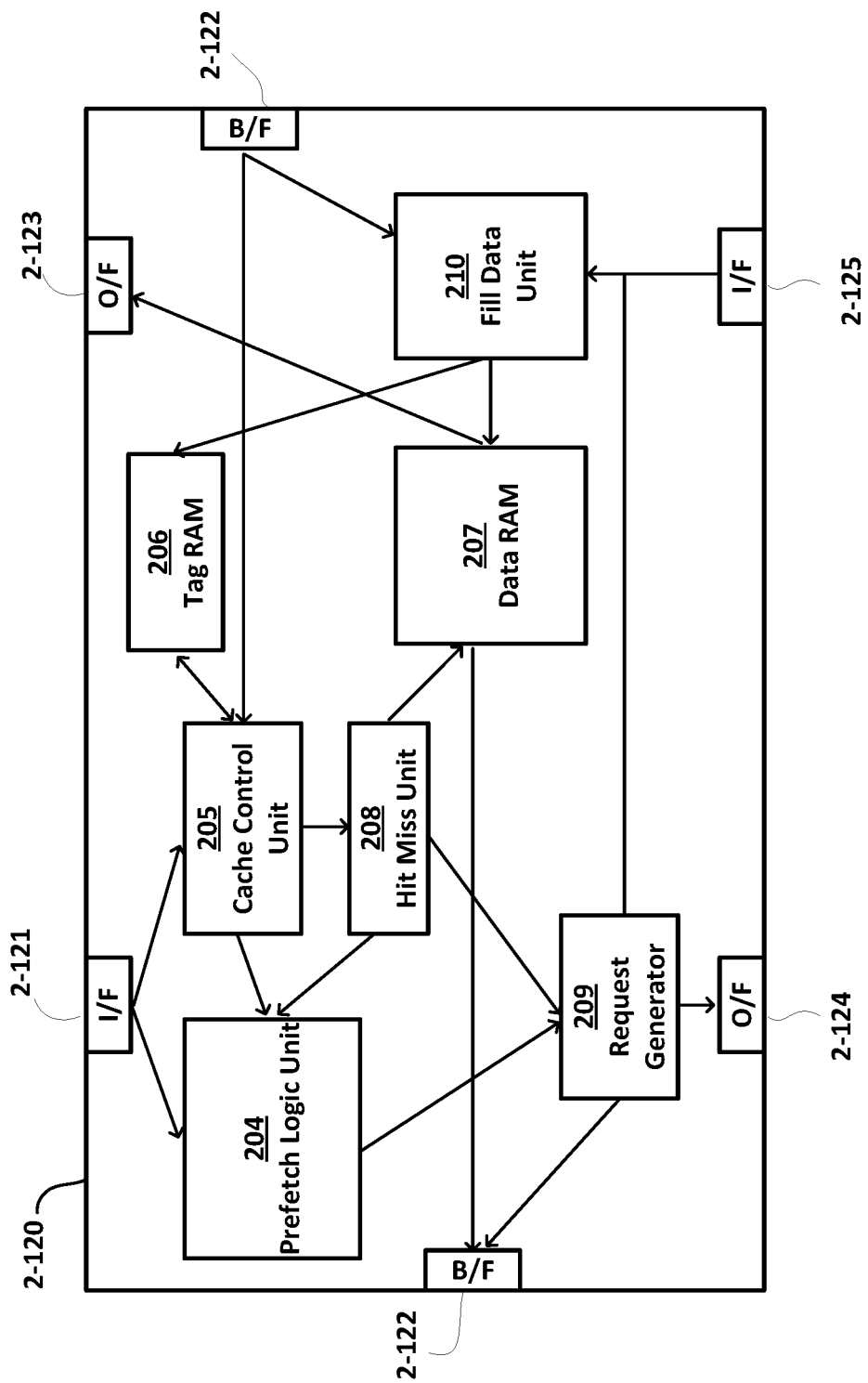
FIG. 2 is a block diagram of the L1 caches according to an embodiment.

FIG. 2 is a block diagram showing logical components of an L1 caches 2-120 according to an embodiment. The L1 cache 2-120 may correspond to one or more of the L1 caches 1-120a, 1-120b, and 1-120c shown in FIG. 1.

The L1 cache 2-120 includes, in addition to the interfaces illustrated in FIG. 1, a Prefetch Logic Unit (PLU) 204, a Cache Control Unit (CCU) 205, a Tag RAM 206, a Data RAM 207, a Hit Miss Unit (HMU) 208, a Request Generator (RG) 209, and a Fill Data Unit (FDU) 210. In an embodiment, one or more of the PLU 204, the CCU 205, the HMU 208, the RG 209, and the FDU 210 may be implemented using an application specific integrated circuit (ASIC).

The PLU 204 may include logic for performing one or more of tracking coherency protocol state transitions of cache lines by monitoring the Tag RAM 206, updating and maintaining a prefetch index table 400 and a prefetch mapping table 420 (see FIG. 4), prompting the RG 209 to transmit prefetch requests to the main memory 140, and the like.

The CCU 205 may a) provide to the PLU 204 or to remote caches hit or miss information when there is a device core load request miss or a remote cache broadcast request miss; b) update the cache coherency states stored in the tag RAM 206 of corresponding cache lines within the framework of a cache coherency protocol; and c) provide information indicating the effective cache coherency state transitions of the corresponding cache lines to the PLU 204. In an embodiment, the cache coherency protocol is a Modified-Owned-Shared-Invalid-Reserved (MOSIR) protocol.

The Tag RAM 206 may store tag information of cache lines including prefetch cache lines that may be or have been stored in the L1 cache 2-120. The tag information may include the coherency protocol states of the cache lines.

The Data RAM 207 may store cache line data. The HMU 208 may detect hit and misses of requests received from a local device core or from one or more remote L1 caches. The RG 209 may generate and transmit prefetch requests. The FDU 210 may fill tag data and cache line data into the tag RAM 206 and data RAM 207, respectively.

Although the L1 cache 2-120 illustrated in FIG. 2 may be any one of the L1 caches 1-120a, 1-120b, and 1-120c illustrated in FIG. 1, for ease of illustration and explanation, the following explanation of how the various components of the L1 cache 2-120 may interact and function will be described from the perspective of the first device core 110a and the first L1 cache 1-120a of FIG. 1. Thus, device core 110a and L1 cache 1-120a may respectively correspond to the local device core and the local L1 cache 2-120. Further, the other device cores 110b and 110c and the other L1 caches 1-120b and 1-120c may respectively correspond to the remote device cores and the remote L1 caches.

In an embodiment, the CCU 205 of the L1 cache 2-120 may receive, via the input interface 2-121, from the local device core a load request for data (e.g., a cache line) that may be stored in one or more the local L1 cache 2-120, the remote L1 caches, and a main memory (such as, for example, the main memory 140 of FIG. 1). The reception of load requests by the CCU 205 from the local device core may be monitored by the PLU 204.

In an embodiment, the PLU 204 may monitor load requests received from the local device core with respect to frame times. That is, the PLU 204 may determine and identify, for each frame time, all the load requests received from the local device core during that frame time.

In an embodiment, a frame time may be a period of time corresponding to a running time of a program being executed by the local device core. In another embodiment, the local device core may be a GPU or a video processor, and the frame time may be a period of time corresponding to a display refresh time. In some embodiments, the length of the frame time may be set by an application running on the local device core or inserted into programming codes by the compiler.

A load request for a cache line that may be received by the local L1 cache 2-120 may identify the requested cache line by its associated address, which may be the main memory address of the cache line. In an embodiment, the PLU 204 may record, for a frame time, all the addresses that were missed during that frame time, and may link (i.e., chain) together all of the missed addresses for that frame time.

Figure 4:
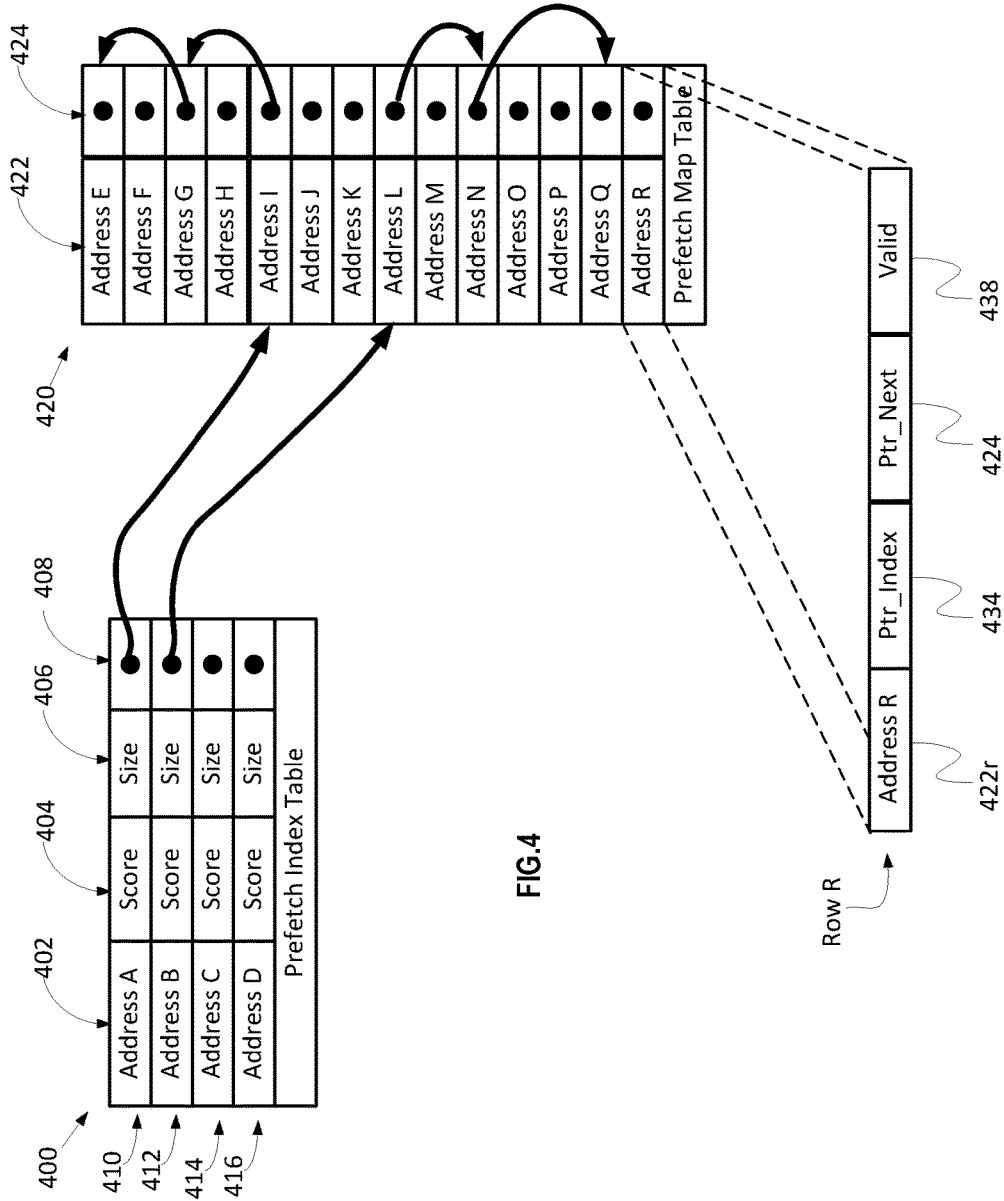
FIG. 4 illustrates data structures to track prefetch address chains according to an embodiment.

In an embodiment, a first missed address of a first missed load request detected by the HMU 208 for a particular frame time may be recorded by the PLU 204 into a prefetch index table 400 (see FIG. 4), and all subsequent missed addresses for that same frame time will be recorded into the prefetch map table 420 (see FIG. 4). As will be further described herein, each of the missed addresses for a particular frame time that are recorded in the prefetch index table 400 and the prefetch map table 420 may be linked together with pointers.

When the CCU 205 receives a load request from the local device core 110a and the HMU 208 determines that the load request is a miss (that is, when the local cache 2-120 is determined not to have the requested cache line), the RG 209 may broadcast the missed request to remote L1 caches. When one of the remote L1 caches has a copy of the requested cache line, the local L1 cache 2-120 may obtain a copy of the requested cache line from that remote L1 cache.

When a remote L1 cache has a copy of the requested cache line, the remote L1 cache may respond to the broadcast by transmitting an Acknowledgement (ACK1) that notifies the local L1 cache 2-120 that the remote L1 cache has a copy of the requested cache line. The remote L1 cache may accomplish the acknowledgement by sharing a copy of the requested cache line with the local L1 cache 110*a*.

When the local L1 cache 2-120 acquires a copy of the requested cache line through a broadcast interface 2-122, the acquired copy of the cache line will be first received by FDU 210, which may put the cache line data into the Data RAM 207 and the tag information of the cache line into the Tag RAM 206.

When the local L1 cache 2-120, and in particular, the CCU 205 gets a No Acknowledgement (NACK) from the remote L1 caches, indicating that the remote L1 caches do not have a copy of the requested cache line, then the RG 209 may issue one or more fetch requests to the main memory. In response, the main memory 140 may provide to the FDU 210 via the input interface 2-125 a copy of the requested cache line.

After the FDU 210 acquires the copy of the requested cache line, either from one of the remote L1 caches or from the main memory 140, the data RAM 207 may provide a copy of the received cache line to the local device core 110*a* in response to a read or write request from the local device core 110*a*.

When the CCU 205 of the local L1 cache 2-120 receives a broadcast request from a remote L1 cache, the CCU 205 may check the tag RAM 206 to determine whether the local L1 cache 2-120 is storing a valid copy of the requested cache line and then provide either a valid data response from the data RAM 207 or a NACK response from the RG 209 to the remote L1 cache that transmitted the broadcast request. This process may be repeated in the other remote L1 caches that received the broadcast request at least until a valid copy of the requested cache line is found in one of the L1 caches or all of the L1 caches that received the broadcast request have provided a NACK response.

Figure 3:
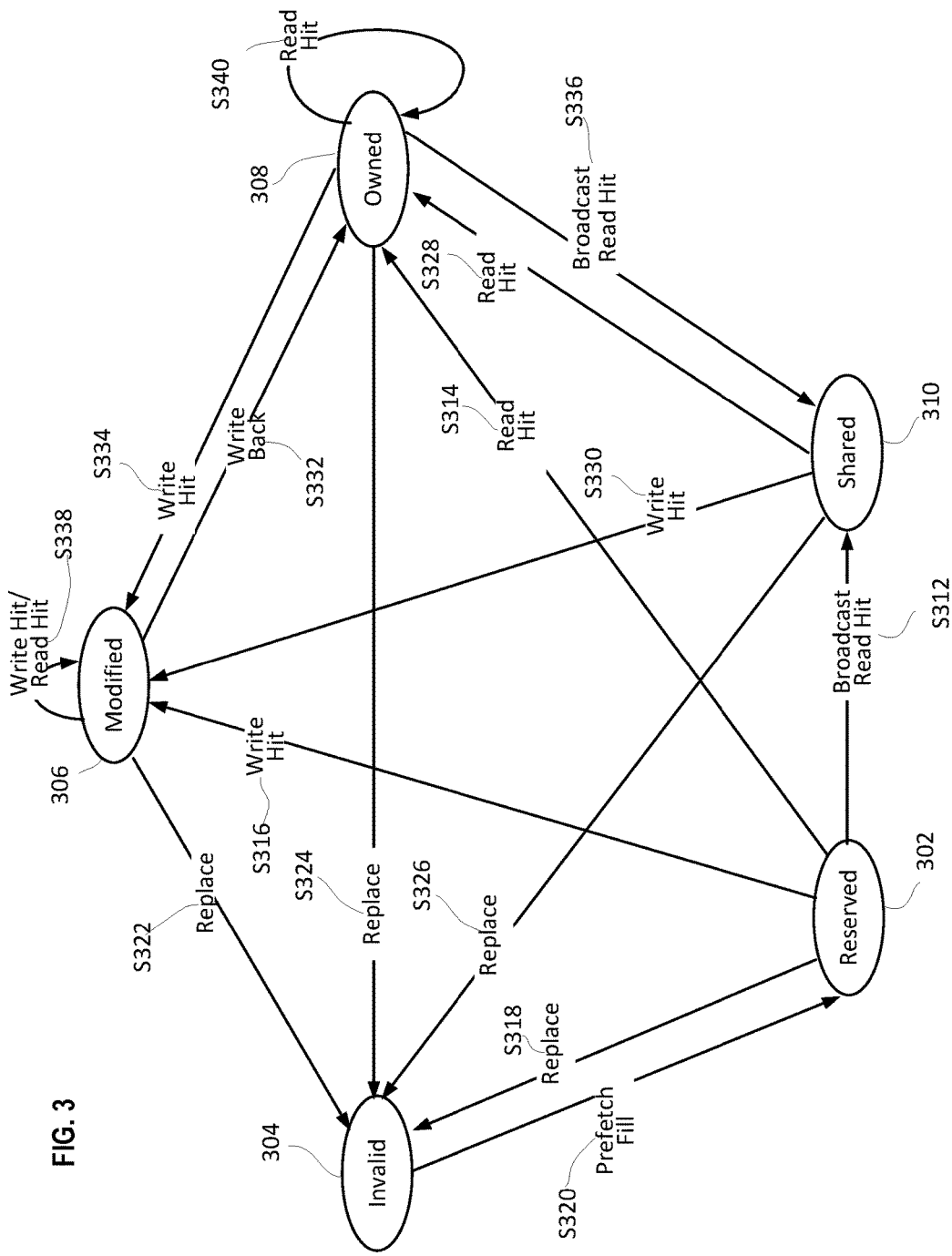
FIG. 3 illustrates state transitions in a Modified-Owned-Shared-Invalid-Reserved (MOSIR) cache coherency protocol according to an embodiment.

FIG. 3 illustrates state transitions in a Modified-Owned-Shared-Invalid-Reserved (MOSIR) cache coherency protocol according to an embodiment. The MOSIR cache coherency protocol (hereinafter, "MOSIR protocol") includes a Modified (M) state 306, an Owned (O) state 308, a Shared (S) state 310, and an Invalid (I) state 304 that are similar to corresponding states in a Modified-Owned-Shared-Invalid (MOSI) cache coherency protocol. The MOSIR protocol illustrated in FIG. 3 may be, for example, used by the CCU 205 the L1 cache 2-120 of FIG. 2 to maintain the coherency of the L1 cache 2-120.

In addition, the MOSIR protocol includes a Reserve (R) state 302 that when tagged to a cache line indicates that the cache line is reserved for later use. In an embodiment, cache lines that are prefetched into a L1 cache 2-120 will be initially tagged as being in the R state 302. That is, the addresses that are stored in the tag RAM 206 of prefetched cache lines may be tagged, in the tag RAM 206, to indicate that the associated cache lines are in the R state 302.

After being tagged as being in the R state 302, an R-tagged cache line stored in the local L1 cache 2-120 may transition to another state in response to an occurrence of one or more events.

At S312, an R state cache line stored in the local L1 cache 2-120 transitions to an S state 310 when, for example, the local L1 cache 2-120 receives a broadcast read request from a remote L1 cache. In this case, the local L1 cache 2-120 determines that the received broadcast request is requesting the R state cache line stored at the local L1 cache 2-120, and as a result a broadcast read hit has occurred. As a result, the local L1 cache 2-120 shares the cache line with the remote L1 cache and the R state cache line transitions to the S state 310.

At S314, an R state cache line stored in the local L1 cache 2-120 transitions to an O state 308, when, for example, the local L1 cache 2-120 receives a read request from the local device core. In this case, the local L1 cache 2-120 has determined that the received read request is requesting the R state cache line stored at the local L1 cache 2-120, and as a result a read hit has occurred. As a result, the local L1 cache 2-120 provides the requested cache line to the local device core and the R state cache line transitions to the O state 308.

At S316, an R state cache line stored in the local L1 cache 1-120*a* transitions to an M state 306, when, for example, the local L1 cache 2-120 receives a write request from the local device core. In this case, the local L1 cache 2-120 has determined that the received write request is requesting to write to the R state cache line stored at the local L1 cache 1-120*a*, and as a result a write hit has occurred. As a result, the R state cache line transitions to the M state 306.

At S318, an R state cache line stored in the local L1 cache 2-120 transitions to an I state 304, when, for example, the local L1 cache 2-120 determines or is notified that the R state cache line has been modified or replaced in a remote L1 cache or in main memory. As a result, the R state cache line transitions to the I state 304.

At S320, an I state cache line stored in the local L1 cache 2-120 transitions to the R state 302 when, for example, a prefetch data fill of the I state cache line has occurred.

At S322, an M state cache line stored in the local L1 cache 2-120 transitions to the I state 304 when, for example, the M state cache line becomes invalid as a result of occurrence of certain events such as the M state cache line being modified or replaced in a remote L1 cache or in the main memory.

At S324, an O state cache line stored in the local L1 cache 2-120 transitions to the I state 304 when, for example, the O state cache line becomes invalid as a result of occurrence of certain events such as the O state cache line being modified or replaced in a remote L1 cache or in the main memory.

At S326, an S state cache line stored in the local L1 cache 2-120 transitions to the I state 304 when the S state cache line becomes invalid as a result of occurrence of certain events such as the S state cache line being modified or replaced in a remote L1 cache in the main memory.

At S328, an S state cache line stored in the local L1 cache 1-120*a* transitions to the O state 308 when, for example, the local L1 cache 2-120 receives a read request from the local device core. In this case, the local L1 cache 2-120 has determined that the received read request is requesting the cache line associated with the S state cache line stored at the local L1 cache 2-120, and as a result a read hit has occurred. As a result, the local L1 cache 2-120 provides the requested S state cache line to the local device core 110*a* and the S state cache line transitions to the O state 308.

At S330, an S state cache line stored in the local L1 cache 2-120 transitions to the M state 306 when, for example, the local L1 cache 2-120 receives a write request from the local device core 110*a*. In this case, the local L1 cache 2-120 has determined that the received write request is requesting to write to the S state cache line stored at the local L1 cache 2-120, and as a result a write hit has occurred. As a result, the S state cache line transitions to the M state 306.

At S332, an M state cache line stored in the local L1 cache 2-120 transitions to the O state 308 when, for example, the M state cache line is written back to the corresponding address in the main memory 140 or broadcasted to one or more of the remote L1 caches.

At S334, an O state cache line stored in the local L1 cache 2-120 transitions to the M state 308 when, for example, the local L1 cache 2-120 receives a write request from the local device core. In this case, the local L1 cache 2-120 has determined that the received write request is requesting to write to the O state cache line stored at the local L1 cache 2-120, and as a result a write hit has occurred. As a result, the O state cache line transitions to the M state 306.

At S336, an O state cache line stored in the local L1 cache 2-120 transitions to an S state 310 when, for example, the local L1 cache 2-120 receives a broadcast read request from a remote L1 cache. In this case, the local L1 cache 2-120 determines that the received broadcast request is requesting the O state cache line stored at the local L1 cache 2-120, and as a result a broadcast read hit has occurred. As a result, the local L1 cache 2-120 shares the O-state cache line with the remote L1 cache and the O state cache line transitions to the S state 310.

At S338, an M state cache line stored in the local L1 cache 2-120 remains in the M state 306 when a write or read request for the M state cache line is received by the local L1 cache 2-120 from the local device core.

At S340, an O state cache line stored in the local L1 cache 2-120 remains in the O state 309 when a read request for the O state cache line is received by the local L1 cache 2-120 from the local device core.

In an embodiment, when an L1 cache 2-120 is full and there are cache lines still to be filled into the L1 cache 2-120, the least recently use (LRU) strategy may be employed to replace cache lines already stored in the L1 cache 2-120. In an embodiment, when there are one or more R-tagged cache lines among the cache lines in the L1 cache 2-120 that may be replaced by a new cache line, one of the R-tagged cache lines may be replaced even if they are not the LRU cache lines to avoid cache pollution. If, on the other hand, there are no R-tagged cache lines in the L1 cache 2-120, the LRU cache lines will be replaced as per the LRU strategy.

In an embodiment, the PLU 204 of a L1 cache 2-120 may monitor and track the historical activities of cache lines that have been prefetched at least once into the L1 cache 2-120 by monitoring and tracking the historical changes in the MOSIR coherency protocol states of the prefetch cache lines, and using the resulting information determine which cache lines to prefetch when there is available space in the L1 cache 2-120. In particular, the PLU 204 may determine, for each frame time, which addresses for requested cache lines were missed during that frame time, and then chain the missed addresses together.

The PLU 204 of the L1 cache 2-120 may further maintain a cumulative score for each address chain that is based on the changes in the coherency states of each address of the address chain. The L1 cache 2-120 may determine whether to prefetch the cache line associated with the address chain based on the cumulative score."

In an embodiment, addresses associated with all missed cache line requests during a particular frame time (e.g., time increment) may be linked together by the PLU 204 of the local L1 cache 2-120. Each of the addresses of the missed cache lines will be R-tagged (that is, tagged as being in an R-state 302 in accordance with the MOSIR coherency protocol) when fetching back from the memory. After the addresses of the missed cache lines have been chained together, the PLU 204 may maintain a running cumulative score for the entire address chain that is based on the changes to the MOSIR protocol states of each cache lines associated with the address chain.

As the addresses of the missed cache lines are being linked together, the missed cache lines may be obtained from a main memory or a remote L1 cache, be loaded into the local L1 cache 2-120, and be tagged as being in R-state 302. One or more of the loaded chained cache lines may or may not eventually be used by the local device core or one or more of the remote device cores.

If one or more of the loaded cache lines are used and switches from an R state 302 to another state such as an O state 308, an M state 306, or an S state 304, the PLU 204 will increase the cumulative score of the entire address chain. If, on the other hand, one or more of the loaded cache lines switches from an R state 302 to an I state 304, the PLU 204 will decrease the cumulative score for the address chain. Eventually, the loaded cache lines of the address chain may be evicted from the local L1 cache 2-120.

The above process for linking together addresses of missed cache lines during a particular frame time may be executed by the PLU 204 and may be repeated for each successive frame time. That is, the PLU 204 may chain together a new address chain (hereinafter "prefetch address chain") for each successive frame times. As a result, multiple prefetch address chains may be determined and maintained by the PLU 204, and the cumulative scores of each of the prefetch address chains may be tracked by the PLU 204. A prefetch address chain may only be disbanded and not considered for prefetching when the cumulative score of the prefetch address chain falls below a certain minimum threshold, which will be referred to herein as drop mode threshold.

The PLU 204 may track and maintain the cumulative score of a prefetch address chain ("PAC") as the associated cache lines are loaded to and evicted from the local L1 cache 2-120. Depending at least on the cumulative score of the PAC, the PLU 204 may determine whether to prefetch the associated cache lines of the PAC into the local L1 cache 2-120. That is, depending at least on the cumulative score of the PAC, the associated cache lines may be: 1) automatically prefetched to the local L1 cache 2-120 whenever there is available space in the local L1 cache 2-120 to accommodate the associated cache lines; 2) prefetched into the local L1 cache 2-120 when a triggering event has occurred; or 3) completely dropped from being considered for prefetching to the local L1 cache 2-120.

FIG. 4 illustrates a prefetch index table 400 and a prefetch map table 420 that may be employed to track prefetch address chains (PAC) in an embodiment. The prefetch index table 400 and the prefetch map table 420 may be managed and maintained by the PLU 204 of FIG. 2. Although the two data structures in FIG. 4 are illustrated as being in the form of tables, other data structures may be employed in alternative implementations to implement the functions to be described herein.

For a particular frame time, the PLU 204 may track and record all the missed load requests during that frame time by recording the corresponding missed addresses of the missed load requests for the frame time to the prefetch index table 400 and the prefetch map table 420 and linking all the missed addresses during the frame time together.

In an embodiment, the first missed address for each frame time will be inserted into the prefetch index table 400, while all succeeding missed addresses for each frame time will be inserted into the prefetch map table 420, with all of the missed addresses during each frame time being linked together using pointers.

For example, the prefetch index table 400 illustrated in FIG. 4 includes four columns: first column 402, second column 404, third column 406, and fourth column 408; and includes four rows: first row 410, second row 412, third row 414, and fourth row 416. Each row 410, 412, 414, and 416 of the prefetch index table 400 includes information related to the first missed address for four different frame times. The fields in first column 402 are for providing the addresses of the first missed addresses of each frame time, and the fields in the fourth column 408 are for pointing to the respective second missed addresses of each of the frame times, where the missed second addresses are placed into the prefetch map table 420.

For example, row 410 includes address A in column 402, which is the first missed address for frame time A. The next missed addressed during frame time A will be place into the prefetch map table 420. The fourth column 408 of first row 410 of the prefetch index table 408 is used to point to the next missed address in frame time A that has been inserted into the prefetch map table 420. In this example, the next missed address (that is, the second missed address) for frame time A is address I. In some cases, the pointer in the fourth column 408 of first row 410 of the prefetch index table 400 may point to address I of the prefetch map table 420 by providing in the fourth column 408 of first row 410 the address of the next missed address, e.g., address I.

The prefetch map table 420 may include multiple rows, each row associated with a missed address. The prefetch map table may further include multiple columns. For ease of illustration, only two columns are illustrated here for each row of the prefetch map table 420 (note a more detailed representation of one of the rows—row r—is illustrated at the bottom of FIG. 4). Each row may include at least two columns, a first column 422 for providing a field to identify the missed addresses, and a second column 424 for pointing to the next missed address during the same frame time.

For example, for frame time A, the second missed address is address I, which is recorded in the prefetch map table 420 and which was pointed to from the first missed address, address A, in row 410 of the prefetch index table 400. Address I in the prefetch map table 420, in turn, points to address G, which is the third missed address in frame time A. Address G then points to address E which is the fourth missed address in frame time A.

The pointing to the next missed address by a previous missed address entry in the prefetch map table 420 may continue until the last missed address in the frame time has been pointed to. As a result of linking together these missed addresses during a frame time (for example, frame time A), a PAC is formed for the frame time, with the first missed addressed for example, address A) for the frame time (for example, frame time A) being recorded in the prefetch index table 400, and the rest of the missed addresses for the frame time being recorded in the index map table 420.

In an embodiment, the PLU 204 may monitor the changes in the states, under the framework of a cache coherency protocol such as the MOSIR protocol, of each cache line associated with each address of a PAC. The PLU 204 may further maintain a cumulative score for the PAC that is based on the changes to the protocol states of each cache line associated with each address of the PAC and which are included in the prefetch index table 400 in the second column 404. For example, the cumulative score for the PAC associated with the first missed address A in FIG. 4 is located in the field to the right of address A in the prefetch index table 400.

The prefetch index table 400 may further indicate in the third column 406 the size of each PAC associated with each of the missed addresses listed in the prefetch index table 400. In some cases, the size of a PAC may be the cumulative data size of all of the cache lines associated with the PAC.

Referring to the lower right side of FIG. 4, which illustrates various fields of row R of the prefetch map table 420. Field 422*r* is for indicating the missed address (that is, address R) for Row R, field 434 is for pointing to a missed address in the prefetch index table 400 that is the first missed address of the frame time associated with address R, field 424 is for pointing to the next missed address during the same frame time, and field 438 is for indicating whether the row (e.g., row R) is valid or invalid.

In an embodiment, the PLU 204 may continuously update the cumulative scores (e.g., column 404) in the prefetch index table 400 of different PACs. For example, if one of the cache lines of one of the linked addresses of a PAC changes from an R state 302 to an O state 308, an M state 306, or an S state 310, the cumulative score for the PAC may be increased by +1. If, on the other hand, one of the cache lines of one of the linked addresses of the PAC changes from an R state 302 to an I state 304, the cumulative score may decrease by −1. This is a linear scoring strategy. However, other scoring strategies may be employed in alternative implementations.

In an embodiment, the PLU 204 may continuously monitor the cumulative scores (for example, as indicated in the second column 404) in the prefetch index table 400 of different PACs in order to determine which PAC to automatically prefetch to the local L1 cache 2-120 when there is open or unused space in the local L1 cache 2-120, to prefetch to the local L1 cache 2-120 when a triggering event has occurred, or to be dropped from consideration for being prefetched by being removed, for example, from the prefetch index table 400 and the prefetch map table 420.

Figure 5:
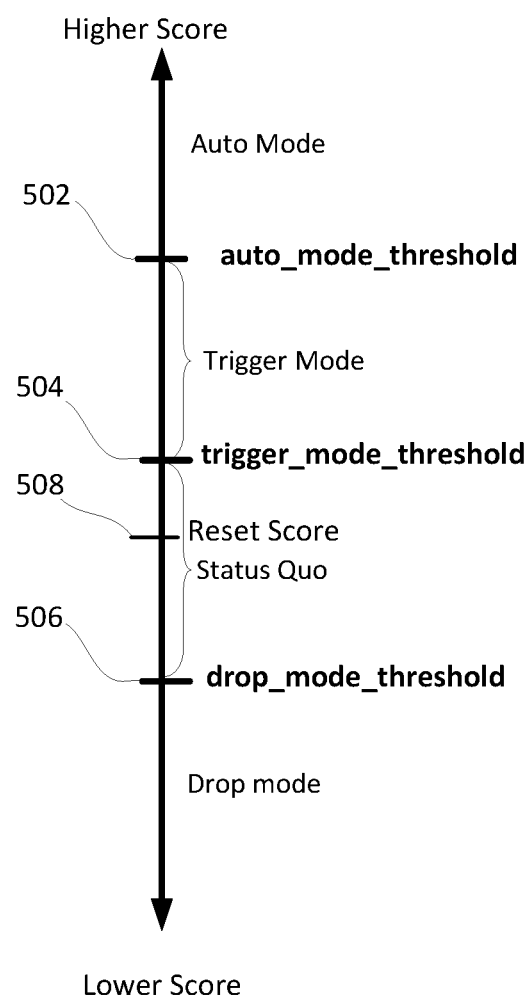
FIG. 5 illustrates prefetch address chain (PAC) cumulative score thresholds according to an embodiment.

FIG. 5 illustrates PAC cumulative score thresholds that may be used to determine which cache lines of PACs are to be prefetched into a L1 cache 2-120 according to an embodiment. In particular, FIG. 5 illustrates an auto_mode_threshold 502, a trigger_mode_threshold 504, and a drop_mode_threshold 506. Depending on a value of a cumulative score of a PAC relative to the cumulative score thresholds of FIG. 5, cache lines associated with the linked addresses of the PAC may be: a) automatically prefetched whenever there is available space in the L1 cache 2-120, b) prefetched in response to a triggering event, or 3) dropped from being considered for prefetching.

For example, the cache lines associated with a PAC may be automatically prefetched when there is at least sufficient available space in the L1 cache 2-120 to accommodate the cache lines and when the cumulative score of the PAC is equal to or greater than the auto_mode_threshold 502. Under such circumstances, the L1 cache 2-120, and more specifically, the PLU 204 of the L1 cache 2-120 will operate in an auto mode at least with respect to the PAC having the cumulative score that is greater than or equal to the auto_mode_threshold 502. As a result, when there is at least sufficient available space in the data RAM 207 of the 1 L1 cache 2-120 and there are no other PACs with a higher cumulative score, the PLU 204 will automatically direct the RG 209 to issue prefetch requests to the main memory 140 in order to prefetch the cache lines associated with the addresses of the PAC.

However, when the cumulative score of a PAC is less than the auto_mode_threshold 502 but is greater than or equal to the trigger_mode_threshold 504, the cache lines associated with the PAC may be prefetched to the L1 cache 2-120 when there is another load request miss for the first address (for example, address A in FIG. 4) of the PAC and when there is sufficient open space in the L1 cache 2-120 to accommodate the prefetched cache lines. Under such circumstances, the 1 L1 cache 2-120, and more specifically, the PLU 204 of the L1 cache 2-120 will operate in trigger mode at least with respect to the PAC having a cumulative score that is less than the auto_mode_threshold 502 but is greater than or equal to the trigger_mode_threshold 504.

When the PLU 204 is operating in the trigger mode with respect to a particular PAC, the cache lines of the trigger mode PAC may be prefetched when a triggering event is detected (e.g., another load request miss of the first address of the PAC) and when certain other conditions are met, for example, there is sufficient available space in the data RAM 207 of the L1 cache 2-120 to accommodate the cache lines and there are no other PAC that is in trigger mode with a higher cumulative score.

In an embodiment, when cache lines associated with the addresses of a PAC are being prefetched from main memory 140, the prefetch requests may be issued by the RG 209 in a burst pattern.

When the cumulative score of a PAC is less than the trigger_mode_threshold 504 but is equal to or greater than the drop_mode_threshold 506, then no action may be taken with respect to the cache lines associated with the PAC and the PAC may remain in consideration for prefetch. In this situation, the L1 cache 2-120, and more specifically, the PLU 204 of the L1 cache 2-120 may operate in status quo mode with respect to that PAC.

When the cumulative score of a PAC is less than the drop_mode_threshold 506, then the cache lines associated with the PAC may be dropped from being considered for prefetching. In some cases, this may be done by removing the PAC from the prefetch index table 400 and the prefetch map table 420 of FIG. 4. That is, once a PAC is dropped from the prefetch index table 400 and the prefetch map table 420, the addresses linked together in the PAC may be disbanded and not considered by the PLU 204 for prefetch from a main memory or from a remote L1 cache.

In an embodiment, when cache lines of a PAC are prefetched to the L1 cache 2-120, the cumulative score for the PAC may be reset to a reset score 508 as illustrated in FIG. 5, which may be between the trigger_mode_threshold 504 and the drop_mode_threshold 502. In an embodiment, the reset score may be zero. In another embodiment, the reset score may be set to a different number such as +10 or −10.

Thus, cache lines associated with PACs with higher scores will be more likely than cache lines associated with PACS with lower scores to be prefetched into the L1 cache 2-120 once memory space available in the L1 cache 2-120 for loading prefetch data. And as previously indicated, if the cumulative score of a PAC drops below the drop_mode_threshold 506, the cache lines associated with the PAC will be dropped from even being considered for prefetching. The term "higher" is a relative term and one of ordinary skill in the art will recognize that the scoring structure illustrated in FIG. 5 may be based on negative numbers. In such a system, the auto_mode_threshold 502 would be at the bottom of the range while the drop_mode_threshold 506 would be at the top of the scoring range, where the auto_mode_threshold 502 is a more or higher negative number than the drop_mode_threshold 506.

Figure 6A:
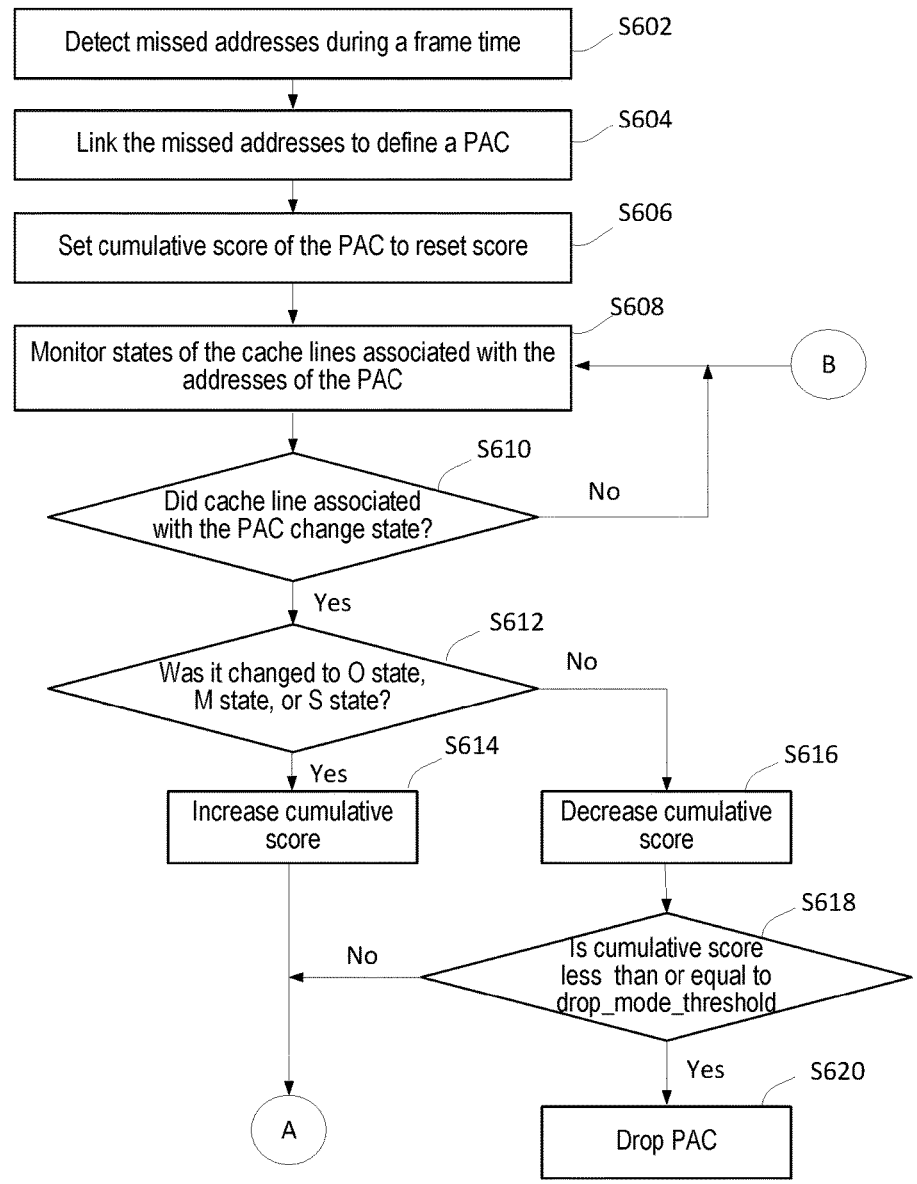

FIGS. 6A and 6B illustrate a process 600 for developing and maintaining a prefetch address chain (PAC) according to an embodiment. The process 600 may be implemented using one or more of the components (for example, the PLU 204, the HMU 208, and so forth of FIG. 2) of an L1 cache. Again, for ease of illustration and explanation, the following discussion of the process 600 will be explained from the perspective of a local device core and a local L1 cache, such as the first device core 110a and the first L1 cache 1-120a of FIG. 1, respectively.

At S602 the local L1 cache detects missed load requests (e.g., missed addresses) during a frame time. In some cases, the frame time may be a period of time that corresponds to a running time of a program. In another case, such as when the local device core is a video processor or a GPU, the frame time may correspond to a display refresh time.

The local L1 cache may link together all of the missed addresses during the frame time at S604 in order to create a PAC. This may be accomplished by, for example, including the first missed address of the frame time into a first data structure (e.g., prefetch index table 400), and to include all of the other missed addresses during the same frame time into a second data structure (e.g., prefetch map table 420), wherein each earlier occurring missed address listed in the data structures is associated with a pointer to the next succeeding missed address of the same frame time to form a linked chain of missed addresses, that is, the PAC.

After the PAC is formed, the cumulative score of the PAC may be set by the local L1 cache to a start or reset score at S606. In some cases, the cumulative score of the PAC may be set to a reset score of zero. The local L1 cache may monitor the MOSIR cache coherency protocol states of cached cache lines associated with the addresses of the PAC at S608. In particular, the PLU 204 may monitor the changes in the MOSIR states of the cached cache lines associated with the addresses of the PAC.

At S610 the local L1 cache determines whether any of the cache lines associated with any of the addresses of the PAC changed its MOSIR protocol state from an R state to another state (e.g., an O state, M state, S state, or I state). When none of the cache lines has changed from an R state to another state, the process 600 returns to S608.

When, on the other hand, the local L1 cache determines that a cache line associated with one of the addresses of the PAC did change from an R state to another state, then at S612 a determination is made by the local L1 cache as to whether the cache line that was determined to have changed its MOSIR state changed from an R state to an O state, an M state, or an S state under the MOSIR protocol. When the local L1 cache determines that the cache line changed its MOSIR state from an R-state to an O state, an M state, or an S state, then at S614 the cumulative score for the PAC is increased and the process 600 moves to S622.

When, on the other hand, the local L1 cache determines at S612 that the cache line did not change its MOSIR state from an R-state to one of an O state, an M state, or an S state, but instead changed to an I state, then at S616 the cumulative score of the PAC is decreased.

At S618, the local L1 cache determines whether the cumulative score of the PAC is less than or equal to a drop_mode_threshold. If the cumulative score of the PAC is determined to be greater than the drop_mode_threshold, then the process 600 proceeds to S622. When the cumulative score of the PAC is determined to be less than or equal to the drop_mode_threshold, then the PAC is dropped by the local L1 cache from being considered for prefetch at S620. In some cases, the PAC may be dropped by the local L1 cache by removing the PAC from the prefetch index table 400 or the prefetch map table 420 maintained by the local L1 cache.

At S622, the local L1 cache determines whether the cumulative score of the PAC is greater than the drop_mode_threshold and is less than or equal to a trigger_mode_threshold. When the PAC is determined to be greater than the drop_mode_threshold and less than or equal to a trigger_mode_threshold, then the process 600 returns to S608. Otherwise, the process 600 proceeds to S624.

At S624, the local L1 cache determines whether the cumulative score of the PAC is between the trigger_mode_threshold and an auto_mode_threshold. When the cumulative score of the PAC is between the trigger_mode_threshold and the auto_mode_threshold, then at S628 the cache lines associated with or corresponding to the addresses of the PAC are prefetched into the L1 cache when a triggering event (e.g., a load request is missed again for the first address of the PAC) is detected and when there is available space in the local L1 cache to accommodate the prefetched cache lines. In an embodiment, a cache line may be prefetched from a remote L1 cache or from the main memory 140. When the cumulative score of the PAC is not between the trigger_mode_threshold and the auto_mode_threshold, the process 600 proceeds to S626.

At S626, the local L1 cache prefetches into the local L1 cache the cache lines that are associated with the addresses of the PAC so long as there is available space in the local L1 cache to accommodate the prefetched cache lines.

In an embodiment, when cache lines associated with the addresses of a PAC are to be prefetched, the addresses of the PAC are scheduled in an out of order buffer, and prefetch requests for the corresponding cache lines of the addresses are generated and issued by the local L1 cache.

Once the cache lines associated with the addresses of the PAC are prefetched, the cumulative score of the PAC may be reset to a reset score at S630. In some implementations, the reset score may be zero. Process 600 may then proceed to S608.

Figure 7:
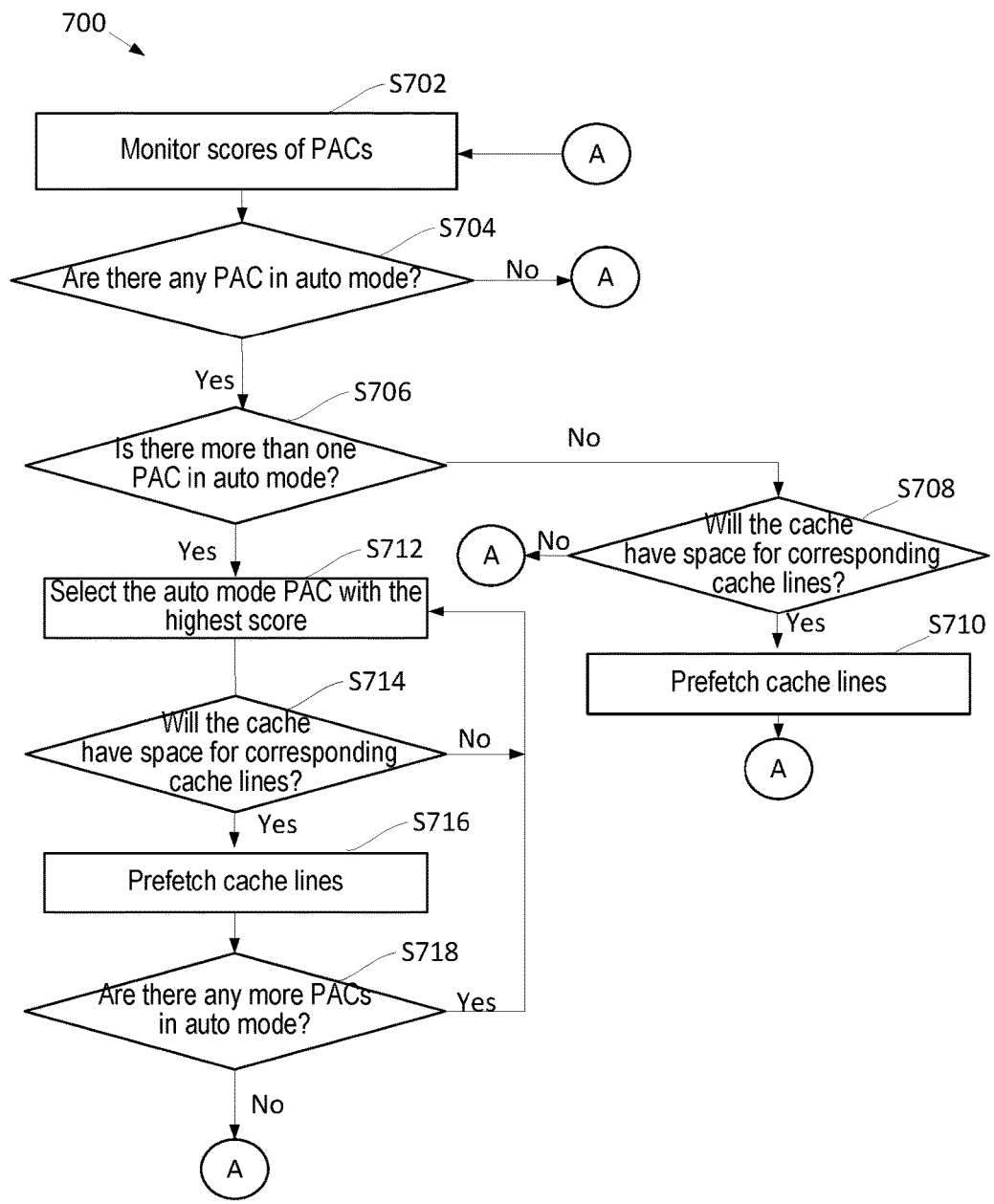
FIG. 7 illustrates a process to prefetch cache lines associated with PACs an auto mode according to an embodiment.

FIG. 7 illustrates a process 700 to prefetch cache lines associated with PACs that have cumulative scores corresponding to an "auto mode" of an L1 cache, according to an embodiment. The process 700 will be described with respect to a local device core and a local L1 cache, such as the first device core 110a and the first L1 cache 1-120a, respectively, of FIG. 1.

At S702 the local L1 cache monitors the cumulative score of each PAC listed in the prefetch index table and prefetch map table maintained by the local L1 cache.

At S704 the local L1 cache determines whether there are any PACs in auto mode (that is, the cumulative score of the PAC is greater than or equal to the auto_mode_threshold). If there are no PACs in auto mode, the process 700 returns to S702.

When there is at least one PAC in auto mode, at S706 the local L1 cache determines whether there is more than one PAC in auto mode.

When there is only one PAC in auto mode, at S708 the local L1 cache determines whether there is sufficient memory space in the local L1 cache to accommodate the cache lines corresponding to the addresses of the only one PAC. When there is insufficient available space (e.g., insufficient available memory) to accommodate the cache lines, then the process 700 returns to S702.

When there is sufficient available space in the data RAM 207, at S710 the cache lines corresponding to the addresses of the PAC are prefetched to the local L1 cache, and the process 700 returns to S702. Upon the cache lines being prefetched, the cumulative score of the PAC is set to the reset score (e.g., zero).

When the local L1 cache determines at S706 that there is more than one PAC in auto mode, at S712 the PAC that is in auto mode and that has the highest score among the PACs in auto mode is selected.

At S714 the local L1 cache determines whether the data RAM 207 has sufficient available space to accommodate the cache lines corresponding to the addresses of the selected PAC. When there is insufficient space in the data RAM 207, then the process 700 returns to S712.

When there is sufficient space in the data RAM 207 to accommodate the cache lines corresponding to the addresses of the selected PAC, then at S716 the cache lines are prefetched. When the cache lines are prefetched, the cumulative score of the selected PAC is set to the reset score.

At S718 the local L1 cache determines whether there are any more PACs that are in auto mode. When there are, then the process 700 returns to S712, otherwise the process 700 returns to S702.

Figure 8:
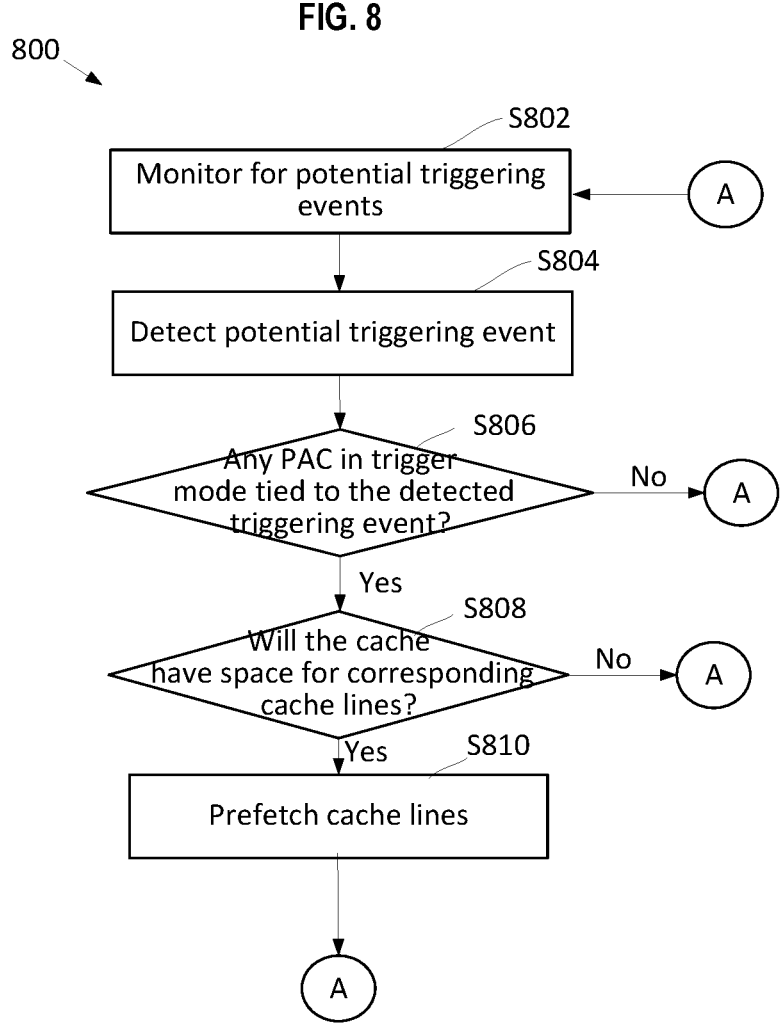
FIG. 8 illustrates a process to prefetch cache lines associated with PACs in a trigger mode according to an embodiment.

FIG. 8 illustrates a process 800 to prefetch cache lines associated PACs that have cumulative scores corresponding to a trigger mode of an L1 cache, according to an embodiment. The process 800 will be explained from the perspective of a local device core 110a and local L1 cache, such as the first device core 110a and the first local L1 cache 1-120a, respectively, of FIG. 1.

At S802 the local L1 cache may monitor for potential triggering events. In some cases, the triggering events may be misses of load requests.

At S804, a potential triggering event is detected.

At S806, the local L1 cache determines whether there are is a PAC that has a cumulative score corresponding to the trigger mode of the local L1 cache (that is, any PAC that are in the trigger mode) and that is tied to the detected triggering event. In other words, cache lines associated with addresses of a PAC that is in the trigger mode will only be prefetched if a specific triggering event (referred to as a tied triggering event) is detected as occurring.

In one embodiment, the triggering event may be a miss load request for the first address of a PAC that is in trigger mode (that is, a PAC that has a cumulative score that is greater than the trigger_mode_threshold but less than auto_mode_threshold). If there is no such PAC, then the process 800 returns to S802. When the local L1 cache determines that there was a PAC in trigger mode that is tied to the detected triggering event, the process 800 proceeds to S808.

At S808, the local L1 cache determines whether the data RAM 207 has sufficient available space to accommodate cache lines associated with the addresses of the PAC. When there is insufficient available memory space in the data RAM 207, the process 800 returns to S802.

When there is sufficient available memory space in the data RAM 207, then at S810 the cache lines associated with the addresses of the PAC will be prefetched to the local L1 cache 1-120a, and the cumulative score of the PAC will be set to the reset score. The process 800 may then return to S802.

Figure 9:
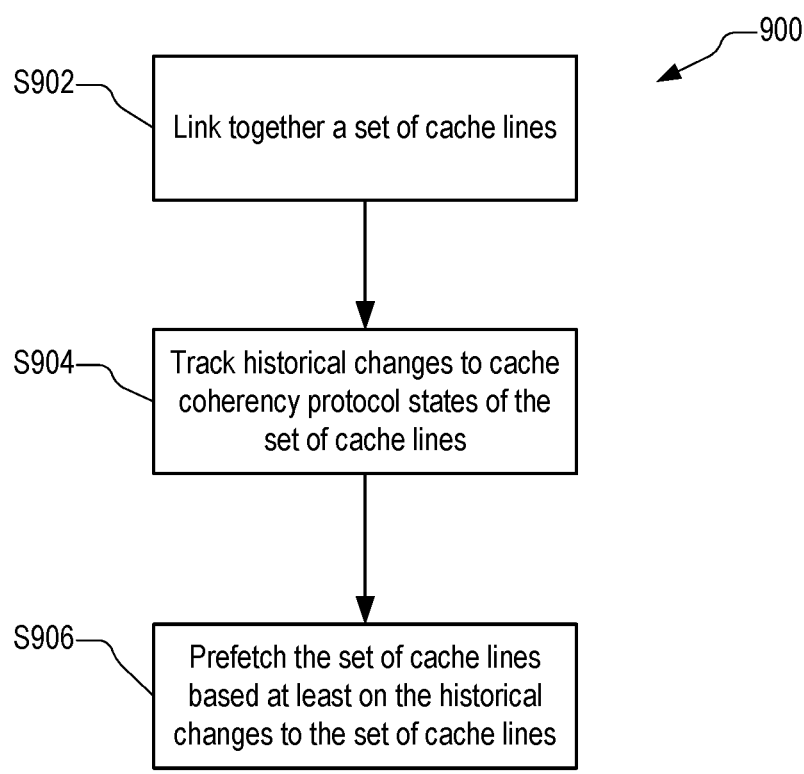
FIG. 9 illustrates a process to prefetch a set of cache lines according to an embodiment.

FIG. 9 illustrates a process 900 to prefetch a set of cache lines according to an embodiment. The process 900 may be performed by a local L1 cache such as the L1 cache 2-120 illustrated in FIG. 2.

At S902, the local L1 cache links together a set of cache lines by, for example, linking the addresses of the set of cache lines together. In some implementations, the addresses that are linked together are missed addresses of cache lines that were missed during a frame time.

At S904, historical changes to the cache coherency protocol states of the set of cache lines are tracked by the local L1 cache. In one implementation, the cache coherency protocol is a Modified-Owned-Shared-Invalid-Reserved (MOSIR) protocol and the historical changes that are tracked are changes from an R state to an M state, an O state, an S state, or an I state of the cache lines. Based on these changes, the local L1 cache may maintain a cumulative score for the linked addresses.

At S906, the local L1 cache may prefetch the set of cache lines based at least on the historical changes to the cache coherency protocol states of the set of cache lines. In one implementation, the PLU 204 of the local L1 cache may prefetch the set of cache lines by directing the RG 209 to issue prefetch requests in a burst pattern. In an embodiment, the set of cache lines may be prefetched based at least on the cumulative score of the linked address of the cache lines, the cumulative score being based on the historical changes to the cache coherency protocol states of each of the cache lines of the set of cache lines.

In one embodiment, the set of cache lines may be prefetched when the cumulative score of the linked addresses equals to or is greater than a threshold (for example, an auto_mode_threshold) and when there is sufficient available cache memory space to accommodate the cache lines.

In an embodiment, the set of cache lines may be prefetched when (a) the cumulative score of the linked addresses is equal to or is greater than a first threshold (for example, the trigger_mode_threshold) and less than a second threshold (for example, the auto_mode_threshold), (b) there is sufficient available cache memory space to accommodate the cache lines, and (c) an occurrence of a triggering event is detected. In some implementations, the triggering event is a missed load request for the first address of the linked addresses.

Aspects of the present disclosure have been described in conjunction with the specific embodiments thereof that are proposed as examples. Numerous alternatives, modifications, and variations to the embodiments as set forth herein may be made without departing from the scope of the claims set forth below. Accordingly, embodiments as set forth herein are intended to be illustrative and not limiting.

What is claimed is:

1. A method, comprising:
linking together a first set of cache lines;
tracking historical changes to cache coherency protocol states of the first set of cache lines; and
prefetching to a cache the first set of cache lines based at least on the historical changes to the cache coherency protocol states of the first set of cache lines,
wherein linking together the first set of cache lines includes linking together missed addresses during a frame time.

2. The method of claim 1, wherein tracking the historical changes to the cache coherency protocol states of the first set of cache lines includes tracking changes of cache lines of the first set of cache lines from a reserve (R) state to one of a modified (M) state, an owned (O) state, a shared (S) state, or an invalid (I) state, where the R state indicates reserved for later use.

3. The method of claim 1, wherein tracking the historical changes to the cache coherency protocol states of the first set of cache lines includes maintaining a cumulative score for a linked address chain of the first set of cache lines, the cumulative score being based on the changes to the cache coherency protocol states of the first set of cache lines.

4. The method of claim 1, wherein prefetching to the cache the first set of cache lines includes prefetching the first set of cache lines to an L1 cache.

5. The method of claim 1, wherein prefetching to the cache the first set of cache lines based at least on the historical changes to the cache coherency protocol states of the first set of cache lines includes prefetching the first set of cache lines based at least on a cumulative score of a linked address chain of the first set of cache lines, the cumulative score being based on the changes to the cache coherency protocol states of the first set of cache lines.

6. The method of claim 5, wherein the first set of cache lines are prefetched when the cumulative score of the linked address chain is equal to or greater than a threshold and when there is sufficient available cache memory space to accommodate the cache lines.

7. The method of claim 5, wherein the first set of cache lines are prefetched when (i) the cumulative score of the linked address chain is equal to or greater than a first threshold and is less than a second threshold, (ii) there is sufficient available cache memory space to accommodate the cache lines, and (iii) a triggering event is detected.

8. The method of claim 7, wherein the triggering event is a missed load request for a first address in the linked address chain.

9. The method of claim 1, further comprising dropping from being considered for prefetching a second set of cache lines when a cumulative score of a linked address chain of the second set of cache lines is less than a threshold, the cumulative score being based on historical changes to cache coherency protocol states of the second set of cache lines.

10. A cache circuit comprising:
one or more random access memories (RAMs) to store cache lines and cache coherency protocol states of the cache lines; and
a prefetch logic unit to:
link together addresses of a set of cache lines;
track historical changes to cache coherency protocol states of the set of cache lines; and
prefetch to the cache circuit the set of cache lines based at least on the historical changes to the cache coherency protocol states of the set of cache lines,
wherein one of the addresses is a first missed address that is missed during a frame time and the other addresses are subsequent missed addresses missed during the frame time.

11. The cache circuit of claim 10, wherein the addresses are linked together in first and second data structures maintained by the prefetch logic unit, and
wherein the first missed address is included in the first data structure and the subsequent missed addresses are included in the second data structure.

12. The cache circuit of claim 10, wherein the prefetch logic unit is to track the historical changes to the cache coherency protocol states of the set of cache lines by tracking changes of cache lines of the set of cache lines from a reserve (R) state to one of a modified (M) state, an owned (O) state, a shared (S) state, or an invalid (I) state, where the R state indicates reserved for later use.

13. The cache circuit of claim 10, wherein the prefetch logic unit is to track the historical changes to the cache coherency protocol states of the set of cache lines by maintaining a cumulative score for a linked address chain of the linked set of cache lines, the cumulative score being based on the changes to the cache coherency protocol states of the set of cache lines.

14. The cache circuit of claim 10, wherein the prefetch logic unit is to prefetch to the cache circuit the set of cache lines based at least on the historical changes to the cache coherency protocol states of the set of cache lines by prefetching the set of cache lines based at least on a cumulative score of a linked address chain of the linked set of cache lines, the cumulative score being based on the changes to the cache coherency protocol states of the set of cache lines.

15. The cache circuit of claim 14, wherein the prefetch logic unit is to prefetch the set of cache lines when at least the cumulative score of the linked address chain equals to or is greater than a threshold and when there is sufficient available cache memory space to accommodate the set of cache lines.

16. The cache circuit of claim 14, wherein the prefetch logic unit is to prefetch the set of cache lines when the cumulative score of the linked address chain equals to or is greater than a first threshold but is less than a second threshold, when there is sufficient available cache memory space to accommodate the set of cache lines, and when a triggering event is detected.

17. A multi-core apparatus comprising:
a plurality of processor cores; and
first and second cache circuits,
wherein the first cache circuit includes:
    one or more random access memories (RAMs) to store cache lines and cache coherency protocol states of the cache lines; and
    a prefetch logic unit to:
        link together a set of cache lines;
        track historical changes to cache coherency protocol states of the set of cache lines; and
        prefetch to the first cache circuit the set of cache lines from a main memory or the second cache circuit, based at least on the historical changes to the cache coherency protocol states of the set of cache lines.

* * * * *